(12) United States Patent
Mikhailov

(10) Patent No.: US 11,892,559 B2
(45) Date of Patent: Feb. 6, 2024

(54) RADAR CALIBRATION SYSTEM AND METHOD FOR MOVING A RADAR CALIBRATION TARGET ALONG A DESIRED MOVEMENT PATH

(71) Applicant: Rohde & Schwarz GmbH & Co. KG, Munich (DE)

(72) Inventor: Yassen Mikhailov, Starnberg (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 657 days.

(21) Appl. No.: 16/719,081

(22) Filed: Dec. 18, 2019

(65) Prior Publication Data

US 2021/0190908 A1 Jun. 24, 2021

(51) Int. Cl.
*G01S 7/40* (2006.01)
*B64C 39/02* (2023.01)
*B64U 101/00* (2023.01)

(52) U.S. Cl.
CPC .............. *G01S 7/40* (2013.01); *B64C 39/024* (2013.01); *G01S 7/4026* (2013.01); *B64U 2101/00* (2023.01); *B64U 2201/20* (2023.01)

(58) Field of Classification Search
CPC ....... G01S 7/40; G01S 7/4026; B64C 39/024; B64C 2201/12; B64C 2201/146; B64C 2201/027; B64C 2201/108; B64U 2201/20; B64U 2101/00
USPC ......................................................... 342/174
See application file for complete search history.

(56) References Cited

U.S. PATENT DOCUMENTS

| 4,283,725 A * | 8/1981 | Chisholm | G01S 7/40 |
| | | | 342/26 B |
| 6,927,725 B2 * | 8/2005 | Wittenberg | G01S 7/4004 |
| | | | 342/174 |
| 8,515,596 B2 * | 8/2013 | Hamke | G05D 1/101 |
| | | | 244/76 R |

(Continued)

FOREIGN PATENT DOCUMENTS

| JP | 2013243655 A * | 12/2013 | G01S 19/14 |
| RU | 2628671 C1 * | 8/2017 | G01S 7/40 |

(Continued)

OTHER PUBLICATIONS

Pones et a. (UAV-mounted_Corner_Reflector_for_In-Situ_Radar_Verification_and_Calibration) (Year: 2018).*

*Primary Examiner* — Nuzhat Pervin
(74) *Attorney, Agent, or Firm* — DITTHAVONG, STEINER & MLOTKOWSKI

(57) ABSTRACT

The invention regards a radar calibration system and a method for moving a radar calibration target along the predefined movement path. The system comprises a radar calibration target, having a reflector of a known radar cross section, the reflector having a discontinuous surface mounted on and at least partially surrounding a drive unit for three dimensionally moving the radar calibration target based on control signals. The calibration target further has a localisation unit for determining a position of the radar calibration target. A control unit is configured to generate the control signals based on position information received from the localisation unit and a desired movement path and the movement of the radar calibration target is then executed by the drive unit based on the control signals.

5 Claims, 3 Drawing Sheets

(56) References Cited

U.S. PATENT DOCUMENTS

Figure 1:
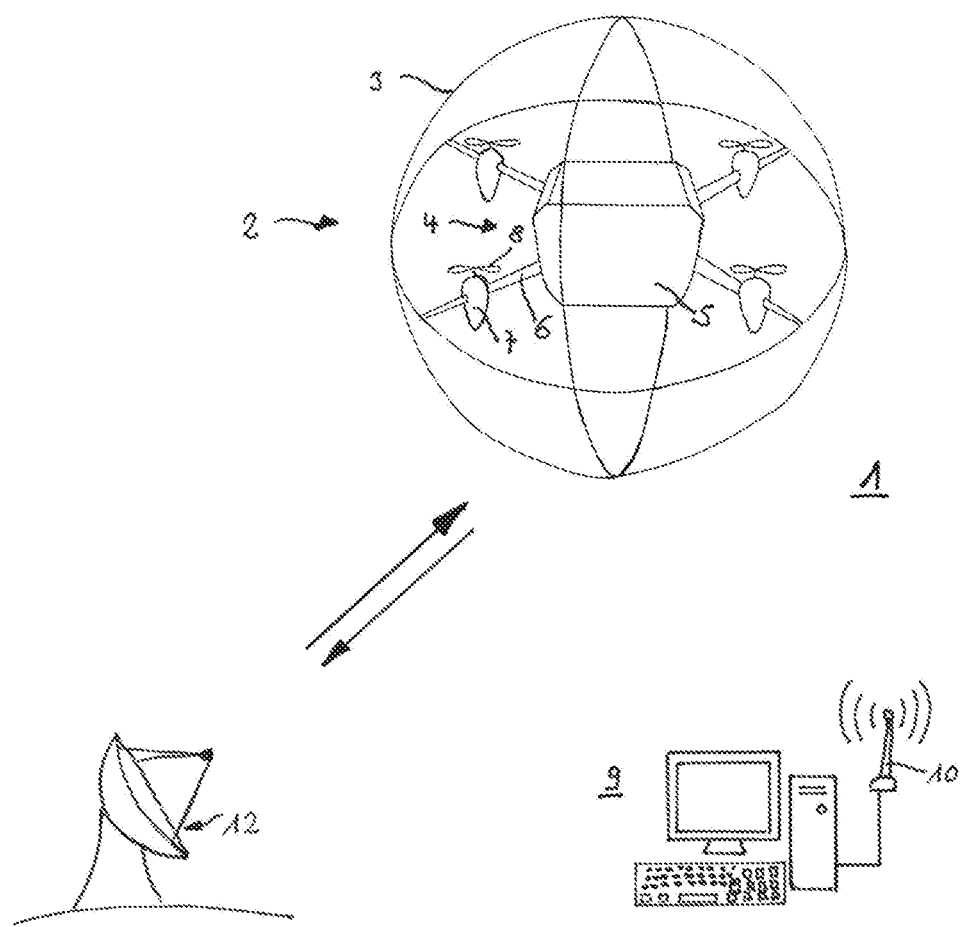

| | | | | |
|---|---|---|---|---|
| 9,739,870 | B1* | 8/2017 | Beckman | B64D 47/00 |
| 10,067,172 | B1* | 9/2018 | Sternowski | B64C 39/024 |
| 11,016,173 | B2* | 5/2021 | Hoffman | G01S 7/4021 |
| 2009/0284408 | A1* | 11/2009 | Bernhardt | B64G 1/105 |
| | | | | 342/174 |
| 2011/0046817 | A1* | 2/2011 | Hamke | G05D 1/101 |
| | | | | 701/3 |
| 2014/0163775 | A1* | 6/2014 | Metzler | G01S 19/11 |
| | | | | 701/2 |
| 2016/0245899 | A1* | 8/2016 | Rybski | G01S 7/4004 |
| 2016/0352022 | A1* | 12/2016 | Thomson | H01Q 1/288 |
| 2017/0363747 | A1* | 12/2017 | Tatarnikov | H01Q 15/168 |
| 2018/0259342 | A1* | 9/2018 | Bitra | G01C 21/188 |
| 2019/0094885 | A1* | 3/2019 | Matsuda | G05D 1/042 |
| 2019/0204414 | A1* | 7/2019 | Steinmetz | G01S 7/40 |
| 2019/0317203 | A1* | 10/2019 | Rosson | G01S 13/46 |
| 2020/0103923 | A1* | 4/2020 | Zhu | G01S 17/933 |
| 2020/0295469 | A1* | 9/2020 | Fenn | H01Q 19/19 |
| 2021/0124013 | A1* | 4/2021 | Motoyama | G06V 20/58 |
| 2022/0082495 | A1* | 3/2022 | Kreitinger | G01N 21/39 |

FOREIGN PATENT DOCUMENTS

| | | | | |
|---|---|---|---|---|
| RU | 2628671 | C1 | 8/2017 | |
| WO | 2018146430 | A2 | 8/2018 | |
| WO | WO-2018146430 | A2 * | 8/2018 | B64C 39/024 |

* cited by examiner

RADAR CALIBRATION SYSTEM AND METHOD FOR MOVING A RADAR CALIBRATION TARGET ALONG A DESIRED MOVEMENT PATH

The invention regards a radar calibration system and a method for moving the radar calibration target along a desired movement path for achieving accurate measurements based on known positions of a known radar target.

Applications for radar systems have become more and more popular over the last years. There are a plurality of different radar systems on the market. The systems are generally used for civilian use but also for defense systems. Accordingly, various types of radar systems have been developed for surveillance, air traffic control, border control, etc. In order to ensure the constant quality of the measurements performed by these radar systems, maintenance is important. For maintenance, periodic checks of existing radar installations and their alignment and calibration is necessary for systems' characteristics such as range, Doppler-effect, azimuth and elevation. Reliable measurements and thus maintenance of radar systems is particularly important since these systems in many use cases are safety relevant systems. Thus, it is desirable to keep time intervals between calibration cycles short. From an economical point of view, it is desirable that the calibration methods are easy to execute.

A number of different calibration methods exist. Typically, a calibration process for a radar system includes moving a target having a known radar cross-section with known parameters, namely a known trajectory were movement path and at known speed. The radar system then measures at least some of these values and a comparison between the actual positions at a time and an actual speed with the measured values is performed. Based on determined differences between the measured values and the actual values, the system is then calibrated.

As it can easily be recognized from the above explained calibration method, it is important for successfully calibrating the system that not only the radar cross-section of the target is exactly known but also, at any time, the positions of the target and its velocity (including heading direction). Usually however, calibration targets are not self-propelled. In many cases, an aircraft toes the targets that are spheres or the targets are launched via balloons. Unfortunately, using these methods for positioning the calibration targets, the coordinates of the targets and their velocity is then difficult to control.

Recently, self-propelled radar calibration targets have been developed that alleviate these problems. WO2018/146430 A2 describes one example for such a self-propelled calibration target. The suggested calibration target comprises a drone, which is partly surrounded by a reflector so that the drone's propellers can lift the calibration target from the ground and move it to desired positions. Still, there seems to be room for improvement: the disclosed proposed self-propelled radar calibration target uses as a reflector a so-called corner-reflector having symmetry with respect to a vertical axis of the calibration target. The vertical axis of the calibration target is the axis to which all the rotation axes of the propellers are parallel. Necessarily, this results in the radar cross-section being dependent on the orientation of the radar calibration target relative to the radiation emitter and increasing elevation may influence the measurement results. Further, the orientation may even be influenced by weather conditions, for example, gusty wind. Of course, influence of wind does not only change the orientation of the radar calibration target but also its position relative to the radar system to be calibrated. The invention disclosed in WO2018/146430 A2 uses a localization unit, such as a GPS, to determine the current position of the radar calibration target. These systems are described to almost instantaneous and exactly determine the position of the target. So for calibrating the radar system, at least, exact knowledge of the actual position of the calibration target is used.

On the other hand, RU 2 628 671 C1 suggests an arrangement where a drone is located inside a sphere building a reflector, with the sphere being made of wires or small diameter tubes such that the mesh size allows the drone to lift and move the calibration target as desired. The calibration target is moved a long a given route, but no means is described for giving feedback of the actual positions of the calibration target. Thus, for repeated measurements, undesired influence like wind may badly affect the measurement results.

It is thus desired to provide a radar calibration system that allows precisely moving the radar calibration target along a predefined, desired movement path and, thus, precise repetition of measurements, and which is easy to use.

This target is achieved by the radar calibration system according to claim 1 and the method for moving a calibration target according to claim 7.

A radar calibration system according to the present invention comprises a radar calibration target and a control unit. The radar calibration target comprises a reflector unit of a known radar cross section, having a discontinuous surface, mounted on and at least partially surrounding a drive unit for three dimensionally moving the radar calibration target based on control signals, and a localisation unit for determining an actual position of the radar calibration target. The control unit is configured to generate the control signals based on position information received from the localisation unit and a desired movement path.

With the system and according to the inventive method it is possible to move the radar calibration target automatically along a desired movement path. The movement path is defined in advance and using a current position, which is determined for the radar calibration target by the localization unit while the target is moved, allows to determine any deviation from the desired movement path. The determined actual position of the radar calibration target is compared with a corresponding desired position. Determination of the actual current position of the radar calibration target and the comparison with the corresponding position according to the desired movement path is repeated at preferably constant time intervals. The desired positions define, in a timely successive manner, the desired movement path. The comparison allows to determine a required movement direction of the calibration target to follow exactly the desired movement path. Based on this comparison, the control unit generates control signals for the drive unit.

Generally, two control strategies may be used: first, the control signals generated may cause a movement that reduces a deviation of the determined position and the corresponding position. In the first case the actual position is compared to a position of the predefined movement path at the same time instance Second, the control signals may be generated such that a movement of the radar calibration target towards the "next" position defined by the desired movement path is executed by the radar calibration target. The desired movement path is defined by a plurality of positions that shall be reached by the radar calibration target successively. For the latter case the term "corresponding position" means the position in the desired movement path that shall be reached after the next time interval from the current position determined by localization unit.

Compared to state-of-the-art, the suggested radar calibration system may follow a desired movement path with high precision without surveillance by an operator. Contrary to the prior art, not only the actual position of the radar calibration target is determined and used for calibrating the radar system, but the suggested system even ensures that the deviation of the radar calibration target from the desired movement path is kept at a minimum. Consequently, even repetitive measurements with highly comparable results as possible. Although the prior art also suggests to use the actual position of the radar calibration target for the calibration, this improves the measurements and calibration because the state-of-the-art may have difficulty in performing redundant measurements with comparable results. With the present invention it is even possible to repeat the desired movement path with high precision even under changing weather conditions, like changing directions of wind.

The sub claims define advantageous features and aspects of the invention.

Preferably, the control unit is mounted in the radar calibration target. By mounting the control unit together with the drive unit inside or at least partly surrounded by the calibration reflector, no exchange of information between the radar calibration target and the remote location is necessary. In such a case, it is possible to store the desired movement path in an on-board memory and to perform all calculations that are necessary to generate the control signals on-board. The desired movement path may be defined and programmed in advance off-line and then transferred to the drive unit mounted on the reflector.

According to another preferred embodiment, the control unit is arranged in a remote station and a communication channel is established between the control unit and the calibration target. Such an arrangement has the advantage that even while measurements are executed, which means while the radar calibration target moves along a desired trajectory, an operator may interrupt the process or adapt the desired movement path, for example. Thus, variability of the system is improved.

Further, processors that are used for generating control signals on board the radar calibration target may have less performance compared to a remote processor, which, consequently, allows to perform more precise calculations or simply faster calculation, which results in reduced time intervals between successive measurements. In the end, this leads to an even increased accuracy.

It is specifically preferred that the drive unit is a drone. Such drones, for example, a quadcopter, are available at low costs and already comprise most of the technology which is needed to include it into the radar calibration system according to the invention. Quadcopters are easy to maneuver and, thus, positioning the radar calibration target at the desired location is possible with high precision. Quadcopters are lightweight and available in a plurality of different sizes so that an adaptation of the radar calibration target for different applications may be performed cost-efficient and without the necessity of individually designing and developing the drive unit. This is particularly important when radar calibration targets using different reflector systems shall be used.

Further, it is advantageous that the reflector unit is designed as a closed sphere, entirely accommodating the drive unit. With the drive unit, preferably the drone, arranged completely inside such a sphere, the measurement is entirely independent from any orientation of the radar calibration target relative to the radiation source. One might think of an influence that the drive unit inside the sphere has on reflection characteristics, but such an influence of the entire calibration target can be avoided by adjusting the mesh size of the discontinuous surface of the reflector to make the drive unit inside the reflector "invisible" for the radar system.

Finally, it is desirable that the reflector unit is electrically connected to the localisation unit and acts as an antenna for the localization unit. In such a case, no further adaptation of the reflector is necessary in order to enable the radar calibration target to determine its actual position by the localization unit. Specifically, no dedicated separate antenna for the localization unit is needed. This is particularly useful in case that the reflector is designed to be a closed sphere which makes it difficult to receive and process signals that are used for localization of the radar calibration target.

Usually, a GPS system will be used in order to determine the location of the radar calibration target.

Figure 2:
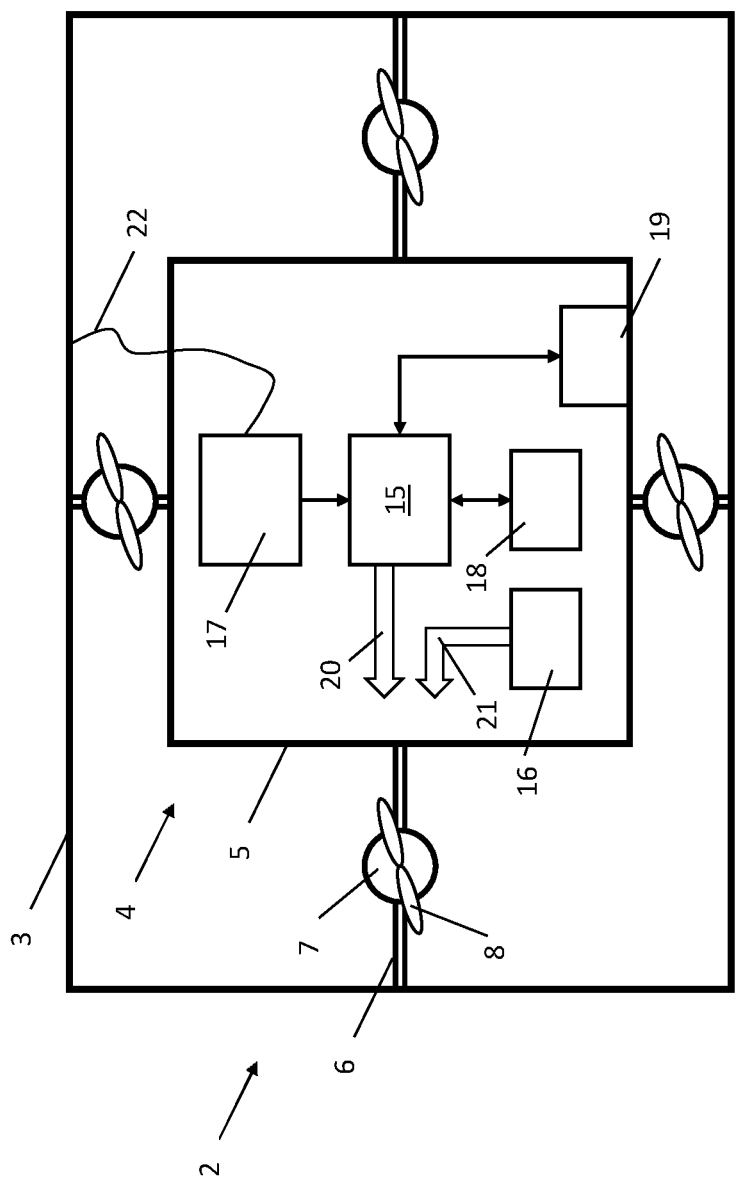
Figure 3:
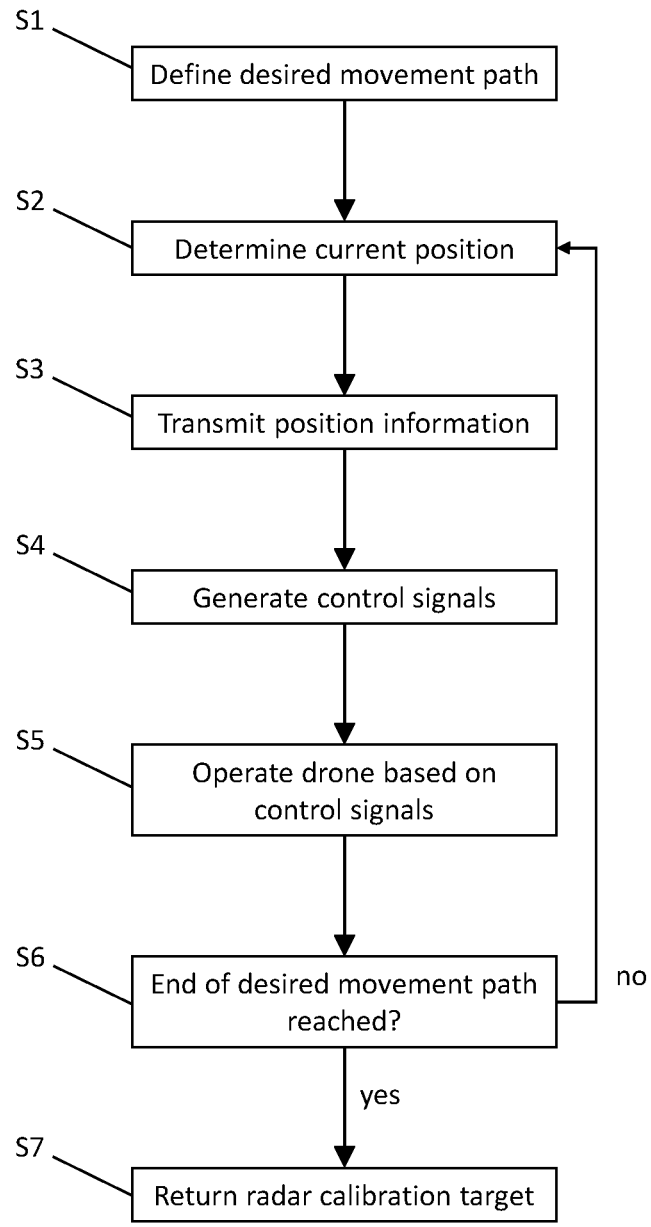

Further features and aspects of the present invention will now be explained with respect to the annexed drawings, in which FIG. 1 shows a schematic of a radar calibration system according to the present invention in an application scenario;

FIG. 2 shows a block diagram of the radar calibration system according to the invention; and FIG. 3 is a simplified flowchart of the method for moving the radar calibration target according to the invention.

FIG. 1 is a schematic illustrating a situation in the process of performing a measurement in order to calibrate a radar system. The radar calibration system 1 comprises a radar calibration target 2. The radar calibration target 2 comprises a reflector unit 3 having a well-known radar cross-section, which is typically chosen to be 1 m$^2$. In the present case, the reflector unit 3 is illustrated only in a very simplified manner. For not occluding other elements of the radar calibration target 2 in the drawing, only the outer contour of the reflector 3 is shown. The reflector 3 has the shape of a hollow sphere and the surface of the sphere is discontinuous.

A discontinuous surface may be created by combining a plurality of wires or small diameter tubes each forming a ring. The entire reflector unit 3 consists of two sets of rings. Each set of rings comprises a plurality of rings made from wires or tubes, which are arranged so as to resemble the lines of constant latitude on a globe. Each ring corresponds to a different latitude value. The symmetry axes of the two groups of rings are perpendicular to each other. Such an arrangement enables the mesh size on the entire surface of the reflector 3 to be constant. By providing a reflector 3 with a discontinuous surface, in which the mesh size is constant all over the surface, it is achieved that the orientation of the reflector 3 does not influence the measurement. The radar cross-section of the reflector 3 is constant for all possible orientations of the radar calibration target 2 relative to the radiation source.

It is to be noted that the mesh building the reflector 3 as described above is only one possible solution and instead of joining a plurality of wire rings or tube rings it is also possible to form two hemispheres of perforated plates, for example, by cupping. The 2 hemispheres are then joined to create the entire reflector 3. In a similar way, the wire rings or the tube rings, rather sections thereof for one group, are joined to form two hemispheres, which then can be connected to each other to generate the closed sphere.

In order to move the reflector 3, and drive unit 4 is arranged inside the reflector 3. In the illustrated embodiment, the drive unit is a drone 4. The drone 4 comprises a main body 5 fixed via a plurality of stays 6 to the reflector 3. Thus, the reflector 3 is mounted on the drone 4. The four stays 6 are arranged in one common plane and each of the stays 6 supports a motor 7 for driving a propeller 8. The rotational axes of the propellers 8 are perpendicular to the stays' plane.

The motors 7 are operated in accordance with drive signals from a motor controller arranged in the main body 5 of the drone 4. The motors 7 are supplied with electrical energy from an energy source, which is also located in the main body 5 of the drone 4. The motor controller energizes the motors 7 based on control signals individually so that speed and movement direction of the entire drone 4 is controlled.

The control signals, which are generated in order to move the radar calibration target 2 at a desired speed and in a desired direction are generated by a control unit that supplies the control signals to the motor control and for finally driving the motors 7. The control unit may be arranged inside the main body 5 of the drone 4 as it will be described later with reference to FIG. 2. However, it is also possible that the control unit is remote from the calibration target 2 as illustrated in FIG. 1. In the embodiment shown in FIG. 1, the control unit is included in a remote station 9, which, for example, may be a computer system used for monitoring and executing the overall calibration process.

The remote station 9 is connected to an antenna 10 to establish communication channel with the radar calibration target 2. In case that the control unit is arranged in the remote station 9, control signals are generated in the control unit of the remote station 9 and then transmitted via the antenna 10 to the radar calibration target 2, where a motor controller converts the control signals to drive signals.

For calibrating a radar system 12, the radar calibration target 2 shall be moved along a desired movement path. The desired movement path is defined in advance, which means before movement of the radar calibration target 2 is started, and as a series of positions that shall be reached by the radar calibration target 2 successfully.

In the illustrated embodiment, the communication channel between the radar calibration target 2 and the remote station 9 is established using radio communication. In such a case, the transmission frequency must be selected relative to the frequency of the emitted radar waves such that communication with the radar calibration target, rather the drone 4, is possible although the mesh size (or open surface of the perforated plate) of the reflector 3 is selected to hide the drone 4 from incident radiation of the radar system 12 and, thus, from scattering the radar waves. Alternatively, the communication may also use light.

The radar calibration target 2 comprises a localization unit (not shown in FIG. 1), which will be referred to as GPS as a typical example and which is also arranged in the main body 5 of the radar calibration target 2. The GPS determines with constant time intervals the actual current position of the radar calibration target 2 and sends respective position information (preferably with its respective timestamp) to the remote station 9. In the remote station 9, the current position of the radar calibration target 2 is compared to the corresponding desired position, where the radar calibration target 2 should be at that point in time where should be at the next time instance (preferably the time instance of the next determination of the actual position). Based on the analysis of the determined actual position and the corresponding position according to the desired movement path, the drone 4 is controlled to move the radar calibration target 2 towards the desired position. Thus, the control unit generates control signals causing the drone 4 to correct the position of the radar calibration target 2 to move closer or even to perfectly match the desired position of the desired movement path.

The control signals may be generated in the form of correction signals superimposed on basic control signals generated in advance based on the desired movement path assuming perfect conditions, i.e. no wind or the like. Alternatively, the entire movement of the radar calibration target 2 is controlled online while the radar calibration target 2 moves. In the latter case, the control signals are generated such that, for each point in time, a movement from the current position of the radar calibration target 2 towards the chronologically next position of the desired movement path is caused by the control signals.

The desired movement path defines for each time instance a desired position and, thus, inherently a desired velocity of movement. The drone 4 moves the reflector 3, which is mounted on the drone 4. The drone 4 has a discontinuous surface so that an airstream generated by the propellers 8 can sufficiently pass the reflector to generate a driving force. At the same time, the mesh size is selected such that radiation emitted from the radar system 12 does not enter the space inside the reflector 3. Thus, the elements arranged inside the reflector 3 are invisible for the radar system 12.

It is to be noted that further description of the process of calibrating the radar system 12 shall be omitted. Once it is ensured that the radar calibration target 2 is moved along a well-defined movement path with known velocity, the process of calibrating the radar system 12 is well known. The calibration itself is executed in a known manner.

Further, it is to be noted that in the preferred embodiment shown in FIG. 1 the reflector 3 is closed sphere entirely accommodating the drone 4. Alternatively, the design of the reflector unit 3 may be chosen to be a corner reflector surrounding, for example, only the outer ends of the stays 6.

FIG. 2 shows the inventive radar calibration system 1 as a block diagram. As already explained with reference to FIG. 1, the reflector unit 3 at least partly surrounds the drive unit, which is a drone 4 in the preferred embodiment. In order to avoid redundant description of the elements already explained with reference to FIG. 1, only those elements are described with reference to FIG. 2, which are newly introduced here.

The main body 5 includes all elements that are necessary to control the motors 7 in order to move the radar calibration target 2 into the desired directions and at desired speeds. One main component inside the main body 5 is a processor 15, in which all signals are processed and calculations are performed that are needed in order to finally output the drive signals to the motors 7.

In the above description regarding FIG. 1 it was mentioned that the control unit may either be located in a remote station 9 or on-board the drone 4. However, it is preferred that the control unit is on-board the drone and established by the processor 15 so that generation of the control signals can be performed without the need to transmit the determined positions of the radar calibration target 2 to a remote station 9.

The drone 4 comprises, in addition to the processor 15 also a battery 16 as the energy source for the motors 7, which is indicated by arrow 21. Additionally, the battery 16 also provides the electrical energy for the processor 15.

The processor 15 generates the control signals in the very same way as explained with respect to FIG. 1. That is, the localization unit, mentioned as GPS 17 in FIG. 2, determines a current position of the radar calibration target 2. The position information is supplied to the processor 15, which analyzes it together with the corresponding position derived from the desired movement path stored in a memory 18. Thus, the processor 15 retrieves corresponding position information from the memory 18, compares it with the actual position derived from the GPS 17 and, based thereon, calculates control signals. The entirety of control signals control each one of the motors 7 to cause the movement of the radar calibration target 2 into the desired direction. Outputting the control signals to the motors 7 is generally referred to by arrow 20. It is understood that a motor controller (driver) may be needed to further convert the control signals to drive signals in order to provide an adjusted current and voltage for driving the motors 7.

The GPS 17 is also supplied with electrical energy from the battery 16. In the illustrated embodiment it is indicated that the GPS 17 is connected to the reflector 3 via a wire 22. The reflector 3 is used as a GPS antenna so that no dedicated GPS antenna on the outer surface of the reflector 3 is needed which would disturb reflection characteristics of the radar calibration target 2.

Further, an interface 19 is provided, which is used to transfer the desired movement path and store it in the memory 18. Such an interface may be accessible through an opening that is provided in the reflector 3. Alternatively, the reflector 3, in case it entirely in capsules the drone 4, may be divided to access the drone 4 for charging but also for transmitting the desired movement path.

Dividing the reflector 3 into two separate pieces, which can be connected with each other, has the further advantage that a modular system is established consisting at least of a drive unit and the reflector. With such a modular system, it is possible to provide a plurality of different reflectors 3, which can be mounted on the drone 4 and which are adapted for characteristics of particular radar systems 12.

FIG. 3 is a simplified flowchart illustrating the steps of controlling the movement of the radar calibration target 2 according to the invention.

First, in step S1, the desired movement path is defined. This is done in advance by an operator by identifying chronologically desired coordinates of positions, where the radar calibration target 2 shall be at successive points in time. The desired movement path is stored either in the memory 18 of the radar calibration target 2 or in the remote station 9.

Then, the radar calibration target 2 takes off at an initial location, which may at least roughly correspond to a starting point of the desired movement path. Once the radar calibration target 2 lifted off, the GPS 17 will determine the current position of the radar calibration target 2 in step S2. The position information is transmitted to the control unit (either the processor 15 within the drone 4 or by transmitting the information to the remote station 9) in step S3.

Based on the determined current position of the radar calibration target 2 and the corresponding position of the desired movement path, control signals are generated in step S4 by the control unit. These control signals are then used to control operation of the motors 7, which is driven based on the information included in the control signals (step S5).

Determination of the current position of the radar calibration target 2, comparing the same with corresponding positions according to the desired movement path and generating respective control signals for moving the Jones 4 and thus the reflector 3 accordingly, is repeated until the end of the desired movement path is reached, which is verified in step S6. When the end of the desired movement path is reached, the radar calibration target 2 is automatically landed, preferably after returning to the initial position in step S6.

The invention claimed is:

1. A radar calibration system comprising:
   a radar calibration target, comprising:
   a reflector of a known radar cross section, the reflector having a discontinuous surface mounted on and at least partially surrounding a driver for three dimensionally moving the radar calibration target based on control signals, wherein the reflector is designed as a closed sphere entirely accommodating the driver, and a localizer for determining a position of the radar calibration target, wherein the reflector is electrically connected to the localizer and acts as an antenna for the localizer, and
   a controller configured to generate the control signals based on position information received from the localizer and a desired movement path.

2. The radar calibration system according to claim 1, wherein the controller is mounted in the radar calibration target.

3. The radar calibration system according to claim 1, wherein the controller is arranged in a remote station and a communication channel is established between the controller and the calibration target.

4. The radar calibration system according to claim 1, wherein the driver comprises a drone.

5. A method for moving a calibration target having a driver with a reflector mounted and a localizer thereon along a desired movement path, the method comprising the steps of:
   defining the desired movement path;
   determining a current position of the radar calibration target by the localizer wherein the reflector is electrically connected to the localizer and acts as an antenna for the localizer; wherein the reflector is designed as a closed sphere entirely accommodating the driver;
   comparing the determined position with a corresponding position of the desired movement path; and
   generating control signals for the driver based on the comparison result such that a movement caused by the control signals reduces a deviation of the determined position and the corresponding position or to move the radar calibration target towards a next position defined by the desired movement path.

* * * * *